(12) United States Patent
Cooper (10) Patent No.: US 6,792,491 B2
(45) Date of Patent: Sep. 14, 2004

(54) INVOKING ACPI SOURCE LANGUAGE CODE FROM INTERRUPT HANDLER

(75) Inventor: Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/027,653

(22) Filed: Dec. 21, 2001

(65) Prior Publication Data

US 2003/0131169 A1 Jul. 10, 2003

(51) Int. Cl.[7] .............................................. G06F 13/24
(52) U.S. Cl. ..................................... 710/260; 710/100
(58) Field of Search ................................ 710/260, 100, 710/305, 11, 16, 62, 72, 104; 713/300, 324, 330, 340

(56) References Cited

U.S. PATENT DOCUMENTS

| | | |
|---|---|---|
| 5,021,679 A | 6/1991 | Fairbanks et al. |
| 5,153,535 A | 10/1992 | Fairbanks et al. |
| 5,307,003 A | 4/1994 | Fairbanks et al. |
| 5,627,412 A | 5/1997 | Beard |
| 5,752,011 A | 5/1998 | Thomas et al. |
| 5,974,557 A | 10/1999 | Thomas et al. |
| 6,065,121 A * | 5/2000 | Hobson et al. ............. 713/300 |
| 6,216,235 B1 | 4/2001 | Thomas et al. |
| 6,219,742 B1 * | 4/2001 | Stanley ....................... 710/260 |
| 6,438,701 B1 * | 8/2002 | Chaiken et al. ............. 713/323 |
| 6,487,668 B2 | 11/2002 | Thomas et al. |

* cited by examiner

Primary Examiner—Tim Vo
(74) Attorney, Agent, or Firm—Cynthia T. Faatz (57) ABSTRACT

In one embodiment of the invention, an embedded controller receives an interrupt command and a query number from a system management interrupt (SMI) handler. The embedded controller generates a system control interrupt (SCI) in response to the interrupt command. A driver that receives the SCI issues a query command to the embedded controller. A routine associated with the query number is invoked in response to the query command.

30 Claims, 5 Drawing Sheets

INVOKING ACPI SOURCE LANGUAGE CODE FROM INTERRUPT HANDLER

BACKGROUND

1. Field of the Invention

This invention relates to microprocessors. In particular, the invention relates to power management.

2. Description of Related Art

The Advanced Configuration and Power Interface (ACPI) specification introduces a new method for performing platform power management and enumeration. The architecture is table-based and has the capability to execute control methods written in ACPI Source Language (ASL) code. The ASL code is interpreted by the Operating System (OS) and allows the platform to execute actions and notify the OS of certain events. Certain operations in ASL code are prohibited by the OS interpreter. Therefore, in many cases, it is required that the ASL code communicate with the platform System Management Interrupt (SMI) handler to perform actions that would otherwise be blocked by the OS. It is possible for the ASL code to generate SMI's by writing specific values to the SMI command port in the chipset, which then results in a SMI being generated that can perform specific actions. Arguments and return parameters can then be passed to and from the ASL code in scratchpad registers located in the chipset.

Recently, advances in microprocessor technology offer mobile users two performance modes: Maximum Performance mode and Battery Optimized mode. Maximum Performance mode takes advantage of the additional power provided by an alternating current (AC) power source to provide a new level of mobile personal computer (PC) performance, while Battery Optimized mode provides optimal performance while running on battery. An OS may operate in either of the two modes. In order to force the OS out of the Maximum Performance mode, it is necessary to invoke an ASL method from within a SMI handler.

Therefore, there is a need to have a technique to invoke an ASL method from an interrupt handler.

BRIEF DESCRIPTION OF THE DRAWINGS

The features and advantages of the present invention will become apparent from the following detailed description of the present invention in which.

DESCRIPTION OF THE INVENTION

The present invention is a technique to invoke an ASL method from a SMI. There are two embodiments. In the first embodiment, the SMI handler issues an interrupt command and a query number to an embedded controller. The embedded controller generates a system control interrupt (SCI) in response to the interrupt command. An ACPI driver then generates a query command to the embedded controller in response to the SCI. The embedded controller returns the query number and the ACPI interpreter invokes an ASL method associated with the query number. The parameters and return values are exchanged between the ASL method and the SMI handler via the scratchpad registers in a chipset. In the second embodiment, the SMI handler writes a method number to the chipset and performs a polarity action on the thermal control input of the chipset. The chipset generates a SCI event in response to the polarity action. The ACPI driver then invokes the ACPI interpreter which in turn invokes a SCI handler for the thermal control input. The SCI handler then reads the method number from the chipset and calls the ASL method associated with the method number. The parameters and return values are exchanged between the ASL method and the SMI handler via the scratchpad registers in the chipset.

The technique allows for a SMI handler to selectively invoke ASL methods in order to communicate effectively with the operating system (OS). The first embodiment is suitable for systems that already have an embedded controller. The embedded controller provides flexibility and requires only a minor change in the firmware. The second embodiment is suitable for systems that do not have an embedded controller.

In the following description, for purposes of explanation, numerous details are set forth in order to provide a thorough understanding of the present invention. However, it will be apparent to one skilled in the art that these specific details are not required in order to practice the present invention. In other instances, well-known structures are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
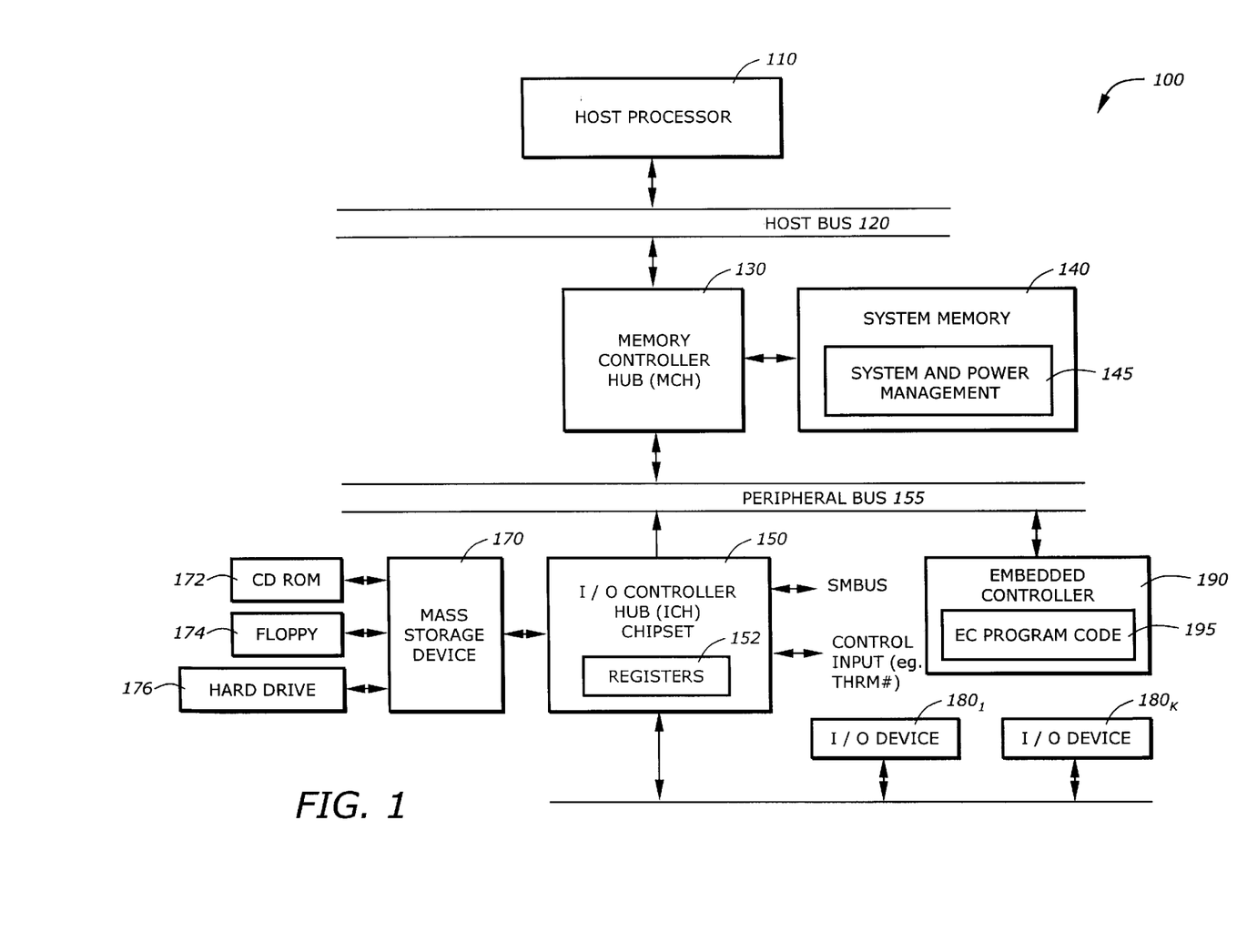
FIG. 1 is a diagram illustrating a system in which one embodiment of the invention can be practiced.

FIG. 1 is a diagram illustrating a system 100 in which one embodiment of the invention can be practiced. The system 100 includes a host processor 110, a host bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a system and power management module 145 which may include separate elements. Any one of the elements of the system and power management module 145 may be implemented by hardware, software, firmware, microcode, or any combination thereof. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc. In one embodiment, the ICH 150 has support for ACPI operations including system management interrupt (SMI), system control interrupt (SCI), and control input such as thermal alarm (THRM#). The control input is used as a means to generate a SCI. Any type of control input that provides a SCI can be used. When the control input is the THRM# pin, inverting THRM# generates a SCI. The ICH 150 includes scratchpad registers 152 to store parameters, query number, or method number that are associated with the invocation of an ASL method from the SMI handler.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The machine-readable media may contain computer readable program code to perform tasks as described in the following. These tasks may include writing parameters, query number, and interrupt command, receiving an interrupt command and a query number, generating a system control interrupt (SCI), invoking a routine, inverting polarity of the thermal control input, etc.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), and any other peripheral controllers.

The embedded controller (EC) 190 is any controller such as micro-controller, digital signal processor, or any programmable device that can execute its own programs. The embedded controller 190 contains EC program code 195. The EC program code contains instructions that cause the EC 190 to perform specified operations.

Figure 2:
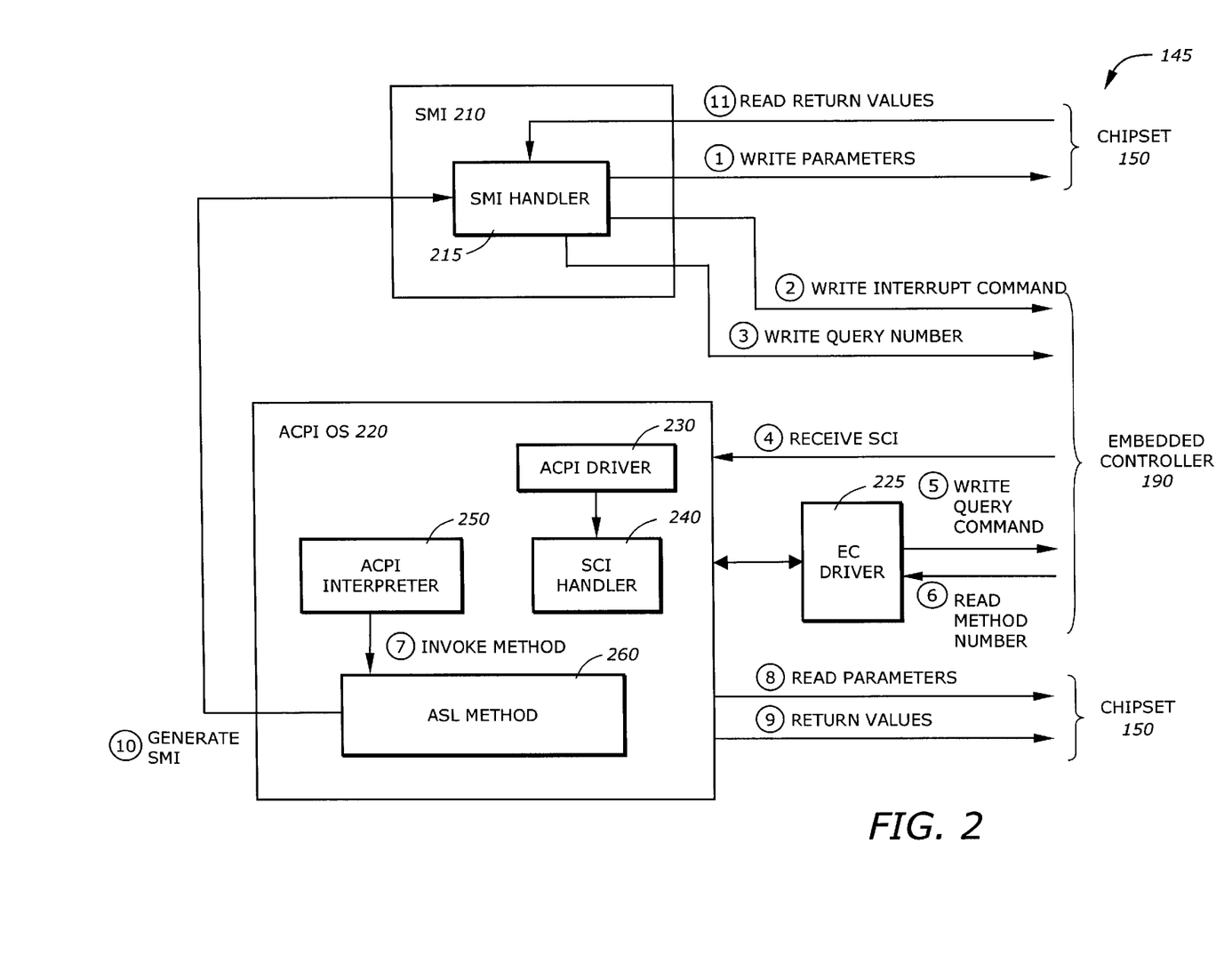
FIG. 2 is a diagram illustrating a system and power management using embedded controller shown in FIG. 1 according to one embodiment of the invention.

FIG. 2 is a diagram illustrating a system and power management (SPM) 145 using embedded controller shown in FIG. 1 according to one embodiment of the invention. The SPM 145 includes a system management interrupt (SMI) 210, an EC driver 225, and an advanced configuration and power interface (ACPI) operating system (OS) 220.

The SMI 210 includes a SMI handler 215. The SMI handler 215 is a routine that is invoked when the SMI is asserted. The SMI handler 215 may perform a number of tasks associated with responses to the SMI. To invoke an ASL method from the SMI, the SMI handler 215 communicates with the chipset 150 and the embedded controller 190 in accordance to a communication protocol or a sequence of operations. In particular, the SMI handler 215 writes the parameters needed by the ASL method to the scratchpad registers in the chipset 150. The SMI handler 215 also write an interrupt command to the embedded controller 190 to instruct the embedded controller 190 to inject a system control interrupt (SCI) to the host processor 10. In addition, the SMI handler 215 writes a query number to the embedded controller 190 that specifies the method to be invoked. When the invoked method completes its operation and return values to the chipset 150, the SMI handler 215 reads the return values from the chipset 150.

The ACPI OS 220 is part of the overall operating system which is designed to conform to a power management policy. In one embodiment, the power management policy follows the Advanced Configuration and Power Interface (ACPI) specification by Compaq Computer Corporation, Intel Corporation, Microsoft Corporation, Phoenix Technologies Ltd., Toshiba corporation, Revision 2.0, published Jul. 27, 2000. The ACPI OS 220 includes an ACPI driver 230, a SCI handler 240, an ACPI interpreter 250, and an ASL method 260.

The ACPI driver 230 and the EC driver 225 each is a routine that is designed to control the embedded controller 190. The ACPI driver 230 receives a SCI from the embedded controller 190 and invokes the SCI handler 240 to handle the SCI. EC driver 225 writes a query command to the embedded controller 190 in response to the SCI. The EC driver 225 also reads the method number from the embedded controller 190. The ACPI interpreter 250 interprets the ASL code. When the SCI handler 240 receives the method number, it invokes the ACPI interpreter 250 which in turns invokes the ASL method 260 corresponding to the specified method number. The ASL method 260 is the routine to be invoked from within the SMI. When invoked, the ASL method 260 is executed. It reads the parameters stored in the chipset 150, performs an operation using these parameters, and then return values as results of the method to the scratchpad registers inside the chipset 150. The ASL method 260 may also generate a SMI to the SMI which is serviced by the SMI handler 215. The order of these steps is shown by a number from 1 through 11 at each step in FIG. 2. The sequence of the steps will be described in details in FIG. 4.

Figure 3:
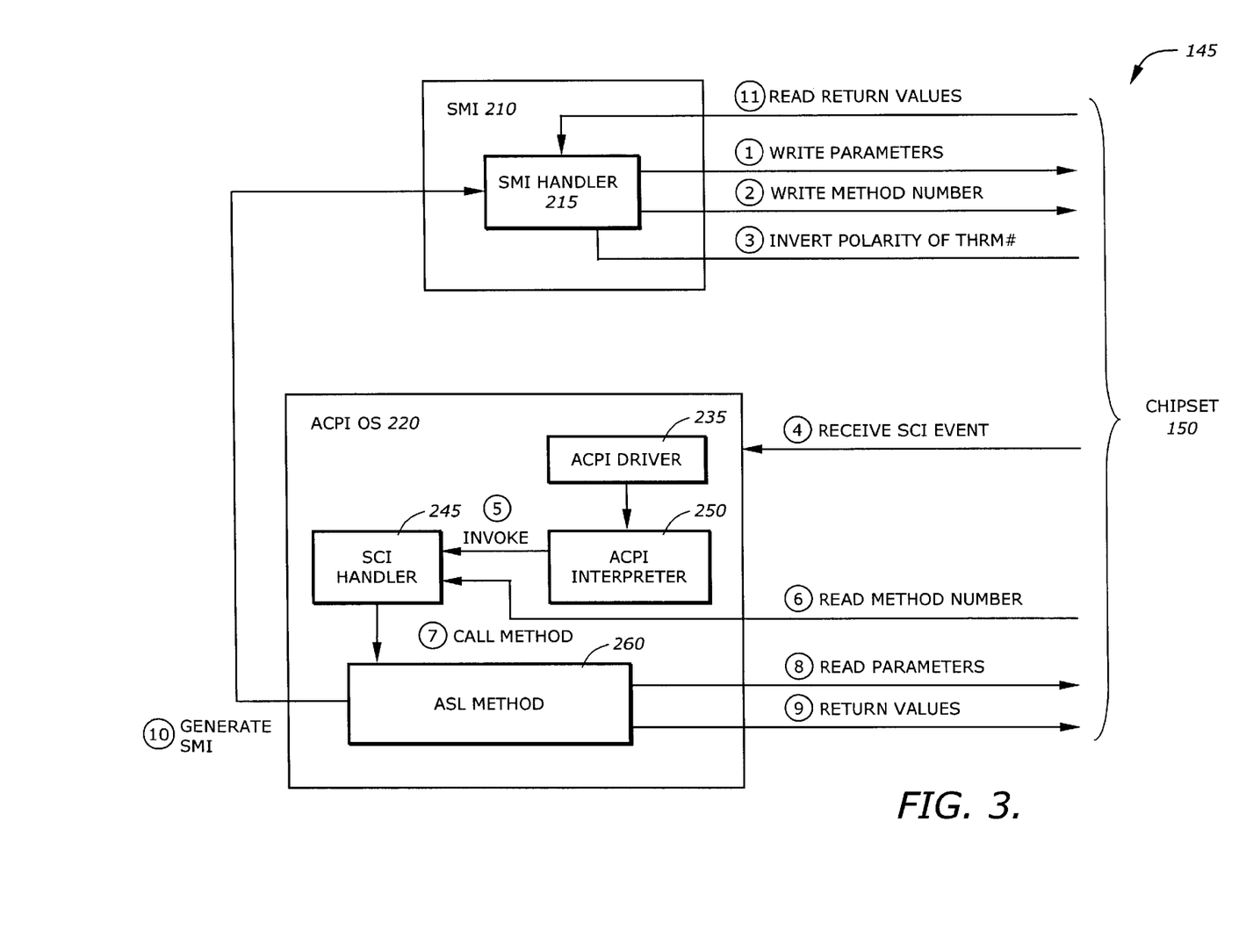
FIG. 3 is a diagram illustrating a system and power management using thermal control input of the chipset shown in FIG. 1 according to another embodiment of the invention.

FIG. 3 is a diagram illustrating a system and power management (SMP) 145 using thermal control input of the chipset shown in FIG. 1 according to another embodiment of the invention. In this embodiment, the SMP 145 includes essentially the same elements as in the embodiment using the embedded controller 190, except that the operations are different. In this embodiment, the embedded controller 190 is not needed. Instead, a thermal control input (e.g., THRM#) to the chipset 150 is used. The SMP 145 includes a SMI 210 and an ACPI OS 220.

The SMI 210 includes the SMI handler 215. In this embodiment, the SMI handler 215 performs the following tasks: write parameters and a method number to the scratchpad registers in the chipset 150, activate the control input (e.g. invert the polarity of the thermal control input) to the chipset, and read the return values from a storage location (e.g. the scratchpad registers in the chipset 150, a memory location, a memory-mapped device).

Figure 5:
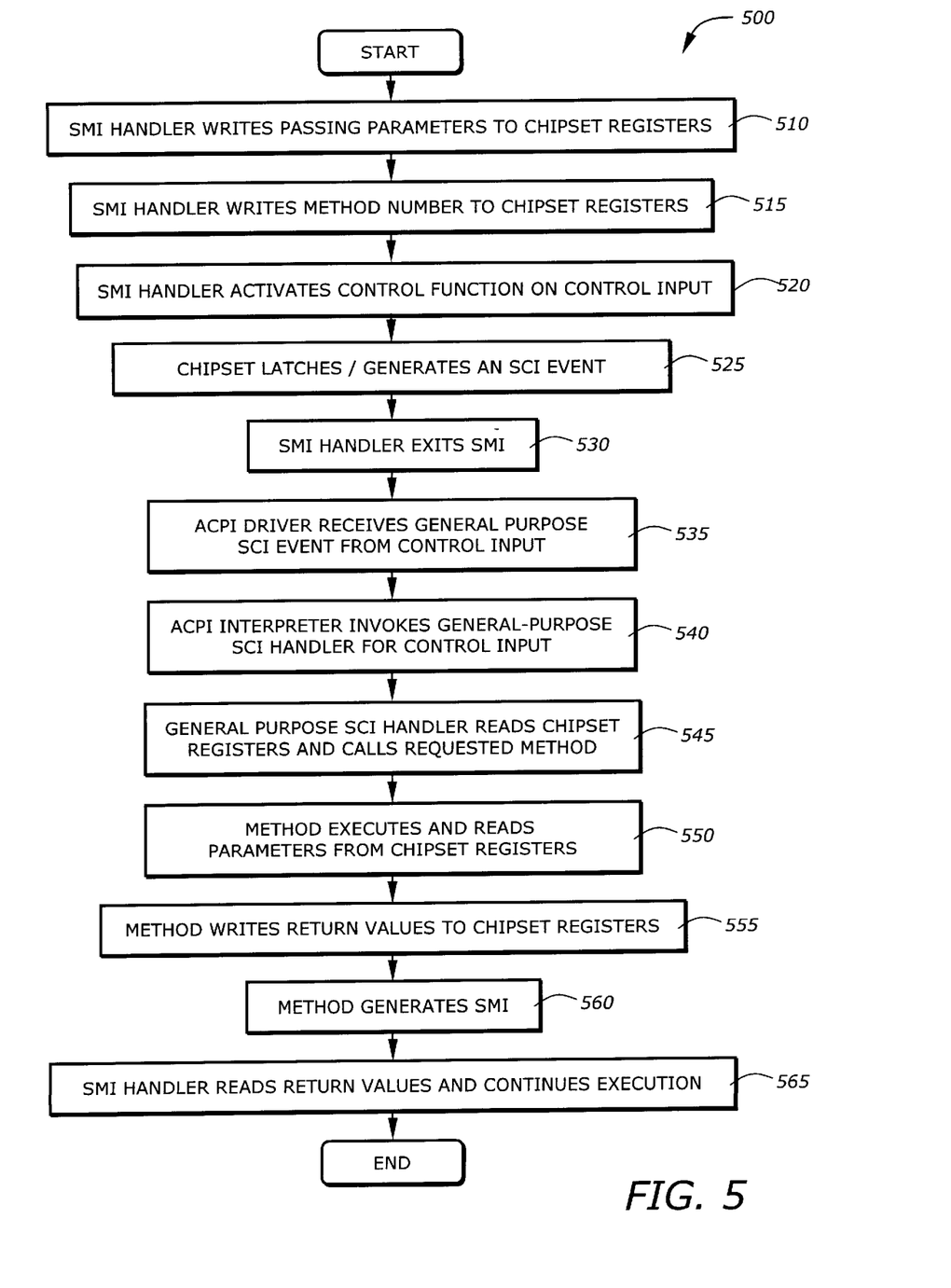
FIG. 5 is a flowchart illustrating a process to invoke a method from SMI using thermal control input of the chipset according to another embodiment of the invention.

The ACPI OS 220 includes an ACPI driver 235, the ACPI interpreter 250, a SCI handler 245, and the ASL method 260. The ACPI driver 235 is a routine designed to control the chipset 150 for this invocation task. The ACPI driver 235 receives a SCI event from the chipset 150 and invokes the ACPI interpreter 250. The ACPI interpreter 250 invokes the SCI handler 245. The SCI handler 245 is a general purpose SCI handler that reads the method number in the scratchpad register in the chipset 150. The SCI handler 245 invokes the ASL method 260 associated with the method number. The ASL method 260 is executed, reads the parameters from the scratchpad registers in the chipset 150, perform the specified operation using these parameters, and return values to the scratchpad registers in the chipset 150. The ASL method 260 also generates a SMI to be serviced by the SMI handler 215. The order of these steps is shown by a number from 1 through 11 at each step in FIG. 3. The details of the sequence of steps for this embodiment are shown in FIG. 5.

Figure 4:
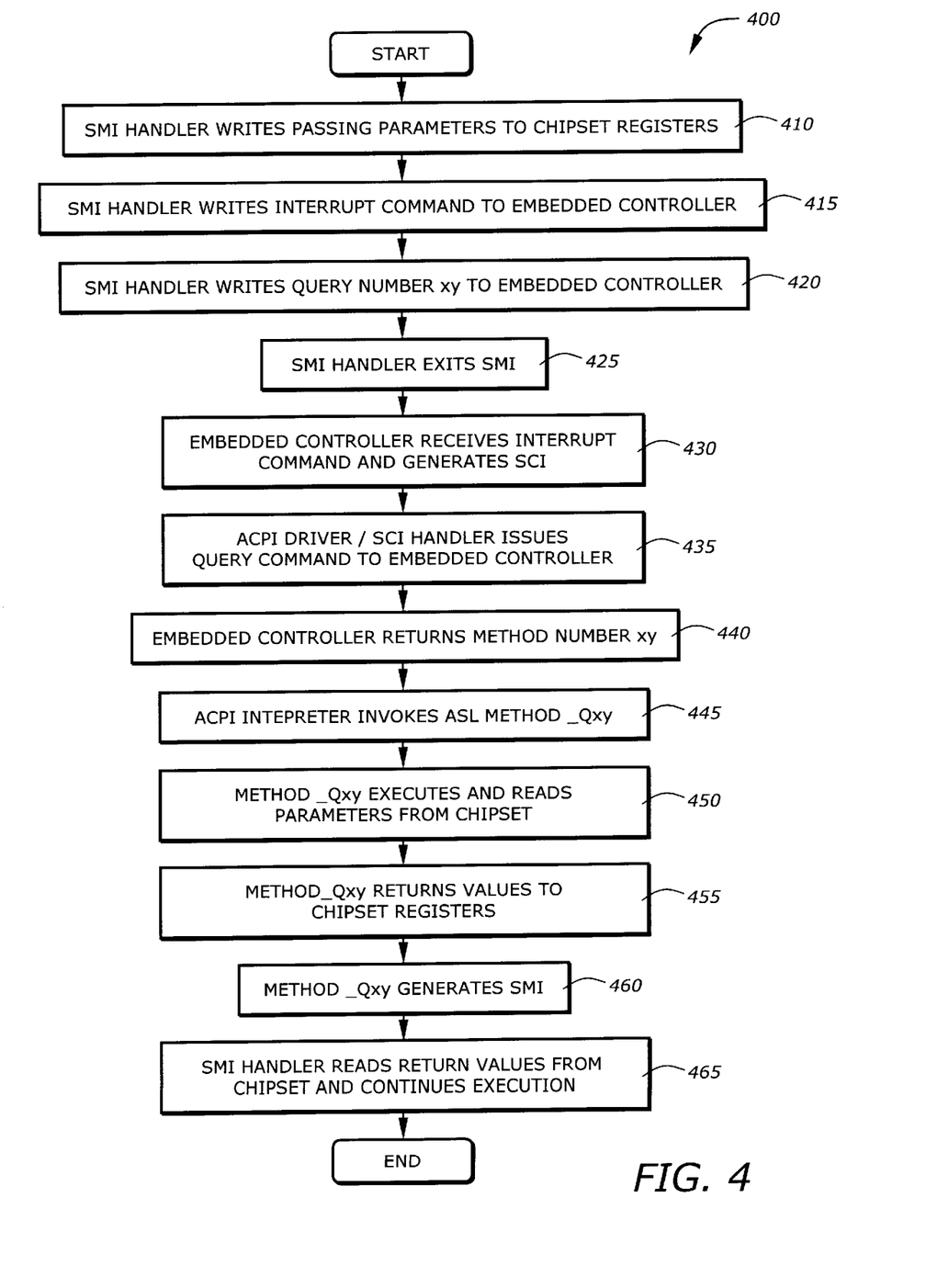
FIG. 4 is a flowchart illustrating a process to invoke a method from SMI using embedded controller according to one embodiment of the invention.

FIG. 4 is a flowchart illustrating a process 400 to invoke a method from SMI using embedded controller according to one embodiment of the invention.

Upon START, the SMI handler writes the passing parameters to the scratchpad registers in the chipset (Block 410). These parameters are those parameters that will be used by the ASL method to perform the specified operation. Next, the SMI handler writes an interrupt command to the embedded controller (Block 415). The interrupt command may be any command that instructs the embedded controller to generate or inject an interrupt to the host processor. In one embodiment, this interrupt is a SCI.

Then, the SMI handler writes a query number xy to the embedded controller (Block 420). The query number xy corresponds to the ASL method to be invoked. Thereafter, the SMI handler exits the SMI (Block 425). The embedded controller receives the passing parameters and the interrupt command. It stores the parameters in the scratchpad registers and generates a SCI in response to the interrupt command (Block 430).

Next, the ACPI driver or the SCI handler issues a query command to the embedded controller in response to the SCI (Block 435). The purpose of the query command is to inquire the method number. In response, the embedded controller returns the method number xy, where xy is an 8-bit hexadecimal number, as received from the SMI handler earlier (Block 440). Then, the ACPI interpreter invokes the ASL method_Qxy associated with the method number xy (Block 445). The ASL method_Qxy is then executed and reads the parameters from the scratchpad registers in the chipset (Block 450). Next, the ASL method_Qxy perform an operation using these parameters and return values as results of the operation to the scratchpad registers in the chipset (Block 455). Then, the ASL method_Qxy generates a SMI to be serviced by the SMI handler (Block 460). The SMI handler is invoked to respond to the SMI. It reads the return values from the scratchpad registers in the chipset and continues execution (Block 465). The process 400 is then terminated.

FIG. 5 is a flowchart illustrating a process 500 to invoke a method from SMI using thermal control input of the chipset according to another embodiment of the invention.

Upon START, the SMI handler writes the passing parameters to the scratchpad registers in the chipset (Block 510). Next, the SMI handler writes the method number to the scratchpad registers in the chipset (Block 515). The method number corresponds to the ASL method to be invoked later. Then, the SMI handler activates a control function on the control input to the chipset (e.g. inverts the polarity of the thermal control input) (Block 520). In one embodiment, this control input is the THRM# input of the chipset.

In response to the polarity action on the thermal control input, the chipset latches or generates a general purpose SCI thermal event (Block 525). Then, the SMI handler exits the SMI (Block 530). Next, the ACPI driver receives the general purpose SCI event from the control input (Block 535). The ACPI driver then invokes the ACPI interpreter which in turns invokes the general purpose SCI handler for the control input (Block 540). Next, the general purpose SCI handler reads the method number from the chipset registers and call the requested method associated with the method number (Block 545).

The ASL method is then executed and reads the parameters from the scratchpad registers in the chips et (Block 550). The method performs an operation using the parameters and writes the return values as results of the operation to the scratchpad registers in the chipset (Block 555). Then, the method may generate a SMI to the host processor (Block 560). In response to the SMI, the SMI handler reads the return values from the scratchpad registers in the chipset and continues execution (Block 565). The process 500 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    receiving an interrupt command and a query number from a system management interrupt (SMI) handler by an embedded controller;
    generating a system control interrupt (SCI) in response to the interrupt command; and
    invoking a routine associated with the query number in response to a query command issued by a driver that receives the SCI.

2. The method of claim 1 further comprising:
    executing the routine, the executed routine generating a SMI to be serviced by the SMI handler; and
    writing parameters to a chipset by the SMI handler.

3. The method of claim 1 wherein invoking the routine comprises:
    invoking a configuration and power interface source language code.

4. The method of claim 2 wherein executing the routine comprises:
    reading the parameters from the chipset;
    performing an operation corresponding to the query number, the operation providing values; and
    returning the values to the chipset.

5. The method of claim 4 further comprising:
    reading the returned values from the chipset by the SMI handler.

6. A method comprises:
    receiving a method number from a system management interrupt (SMI) handler by a chipset;
    latching a system control interrupt (SCI) event in response to a polarity action by the SMI handler at a thermal control input to the chipset; and
    invoking a routine associated with the method number in response to the SCI event.

7. The method of claim 6 further comprises:
    receiving parameters by the chipset, the parameters being provided by the SMI handler; and
    executing the routine, the executed routine generating a SMI to be serviced by the SMI handler.

8. The method of claim 7 wherein invoking the routine comprises:
    invoking a configuration and power interface source language code by the SCI handler in response to the SCI event.

9. The method of claim 7 wherein executing comprises:
    reading the parameters from the chipset;
    performing an operation corresponding to the method number, the operation providing values; and
    returning the values to the chipset.

10. The method of claim 9 further comprising:
    reading the returned values from the chipset by the SMI handler.

11. A computer program product comprises:
    a machine useable medium having computer program code embedded therein, the computer program product having:
        computer readable program code to receive an interrupt command and a query number from a system management interrupt (SMI) handler by an embedded controller;
        computer readable program code to generate a system control interrupt (SCI) in response to the interrupt command; and
        computer readable program code to invoke a routine associated with the query number in response to a query command issued by a driver that receives the SCI.

12. The computer program product of claim 11 further comprising:
    computer readable program code to execute the routine, the executed routine generating a SMI to be serviced by the SMI handler; and
    computer readable program code to write parameters to a chipset by the SMI handler.

13. The computer program product of claim 11 wherein the computer readable program code to invoke the routine comprises:
    computer readable program code to invoke a configuration and power interface source language code.

14. The computer program product of claim 12 wherein the computer readable program code to execute the routine comprises:
    computer readable program code to read the parameters from the chipset;
    computer readable program code to perform an operation corresponding to the query number, the operation providing values; and
    computer readable program code to return the values to the chipset.

15. The computer program product of claim 14 further comprising:
    computer readable program code to read the returned values from the chipset by the SMI handler.

16. A computer program product comprises:
    a machine useable medium having computer program code embedded therein, the computer program product having:
        computer readable program code to receive a method number from a system management interrupt (SMI) handler by a chipset;
        computer readable program code to latch a system control interrupt (SCI) event in response to a polarity action by the SMI handler at a thermal control input to the chipset; and
        computer readable program code to invoke a routine associated with the computer program product number in response to the SCI event.

17. The computer program product of claim 16 further comprises:
    computer readable program code to receive parameters by the chipset, the parameters being provided by the SMI handler; and
    computer readable program code to execute the routine, the executed routine generating a SMI to be serviced by the SMI handler.

18. The computer program product of claim 17 wherein the computer readable program code to invoke the routine comprises:
    computer readable program code to invoke a configuration and power interface source language code by the SCI handler in response to the SCI event.

19. The computer program product of claim 17 wherein the computer readable program code to execute comprises:
    computer readable program code to read the parameters from the chipset;
    computer readable program code to perform an operation corresponding to the method number, the operation providing values; and
    computer readable program code to return the values to the chipset.

20. The computer program product of claim 19 further comprising:
    computer readable program code to read the returned values from the chipset by the SMI handler.

21. A system comprising:
    a host processor;
    a system memory coupled to the host to store advanced configuration and power interface (ACPI) operating system (OS), the ACPI OS interfacing to a system management interrupt to (SMI) handler respond to a SMI and a system control interrupt (SCI) handler to respond to a SCI;
    a chipset coupled to the host processor to store parameters provided by the SMI handler; and
    an embedded controller (EC) coupled to the host processor, the EC having an EC memory, the EC memory containing EC program code, the EC program code, when executed by the EC, causing the EC to:
        receive an interrupt command and a query number from the SMI handler,
        generate a system control interrupt (SCI) in response to the interrupt command, and
        generate the query number to the SCI handler in response to a query command provided by the SCI handler; and
    wherein the SCI handler, when executed, causes the host processor to invoke a routine associated with the query number.

22. The system of claim 21 wherein the ACPI OS, when executed, causes the host processor to execute the routine that generates a SMI to be serviced by the SMI handler.

23. The system of claim 21 wherein the routine is a configuration and power interface source language code.

24. The system of claim 22 wherein the ACPI OS, when executed, causes the host processor to:
    read the parameters from the chipset;
    perform an operation corresponding to the query number, the operation providing values; and
    return the values to the chipset.

25. The system of claim 24 wherein the SMI handler, when executed, causes the host processor to read the returned values from the chipset.

26. A system comprising:
    a host processor;
    a system memory coupled to the host to store advanced configuration and power interface (ACPI) operating system (OS), the ACPI OS interfacing to a system management interrupt (SMI) handler to respond to a SMI and a system control interrupt (SCI) handler to respond to a SCI event; and
    a chipset coupled to the host processor to store parameters and a method number provided by the SMI handler, the chipset having a thermal control input, the chipset generating a SCI event in response to a polarity action by the SMI handler at the thermal control input;
    wherein the SCI handler, when executed, causes the host processor to invoke a routine associated with the method number in response to the SCI event.

27. The system of claim 26 wherein the SCI handler, when executed, causes the host processor to execute the routine, the executed routine generating a SMI to be serviced by the SMI handler.

28. The system of claim 27 wherein the routine is a configuration and power interface source language code.

29. The system of claim 27 wherein the SCI handler, when executed, causes the host processor to:
    read the parameters from the chipset;
    perform an operation corresponding to the method number, the operation providing values; and
    return the values to the chipset.

30. The system of claim 29 wherein the SMI handler, when executed, causes the host processor to read the returned values from the chipset.

* * * * *

UNITED STATES PATENT AND TRADEMARK OFFICE
CERTIFICATE OF CORRECTION

PATENT NO. : 6,792,491 B2
DATED : September 14, 2004
INVENTOR(S) : Cooper

It is certified that error appears in the above-identified patent and that said Letters Patent is hereby corrected as shown below:

Column 4,
Line 55, delete "10" and insert -- 110 --.

Column 9,
Line 20, before "(SMI)", delete "to".
Line 20, after "handler", insert -- to --.

Signed and Sealed this

Tenth Day of May, 2005

JON W. DUDAS
*Director of the United States Patent and Trademark Office*